United States Patent [19]

Ferraro

[11] Patent Number: 4,561,663
[45] Date of Patent: Dec. 31, 1985

[54] JAW LOCKING MEANS FOR LATHE CHUCKS
[75] Inventor: Thomas A. Ferraro, Hatfield, Pa.
[73] Assignee: Lock Jaws, Inc., Conshohocken, Pa.
[21] Appl. No.: 612,257
[22] Filed: May 21, 1984

Related U.S. Application Data

[63] Continuation-in-part of Ser. No. 398,106, Jul. 14, 1982, abandoned.

[51] Int. Cl.⁴ .............................................. B23B 31/10
[52] U.S. Cl. .................................. 279/123; 279/1 SJ; 279/110
[58] Field of Search ..................... 279/123, 110, 1 ME, 279/1 SJ

[56] References Cited

U.S. PATENT DOCUMENTS

| 1,063,917 | 6/1913 | Gates | 279/123 |
| 1,064,539 | 6/1913 | Ream | 279/123 X |
| 1,454,148 | 5/1923 | Bisset | 279/123 |
| 2,401,971 | 6/1946 | Schuster | 279/123 |
| 2,687,308 | 8/1954 | Highberg et al. | 279/123 |
| 2,777,704 | 1/1957 | Sloan | 279/123 |

FOREIGN PATENT DOCUMENTS

| 521489 | 7/1921 | France | 279/123 |
| 2311622 | 12/1976 | France | 279/123 |
| 2016311 | 9/1979 | United Kingdom | 279/123 |

Primary Examiner—Gil Weidenfeld
Assistant Examiner—Glenn L. Webb
Attorney, Agent, or Firm—Joseph W. Molasky

[57] ABSTRACT

To firmly retain the jaw of a lathe chuck against movement it is formed with a transverse passageway or hole through it about midway of its length, a U-block is inserted in it in an inverted position so its legs will bear on the chuck face and a bolt is threaded in the jaw directly above the U-block so it will bear on the block and force it against the chuck face.

13 Claims, 9 Drawing Figures

JAW LOCKING MEANS FOR LATHE CHUCKS

This application is a continuation-in-part application Ser. No. 398,106, filed July 14, 1982.

BACKGROUND AND SUMMARY OF THE INVENTION

This invention relates to chucks for holding work pieces in lathes or like work piece rotating machines and particularly to means for rigidly holding the jaws against movement.

To carry out the present day precision in lathe work it is essential that the jaw faces which bear against the work accurately define a circle which is in absolute axial alignment with the axis of the work piece. This can be achieved by individually adjusting the jaws radially back and forth until the work is positively positioned in its intended location, but this is a very time consuming and tedious task. The working time which is lost in such a procedure is totally inconsistent with high productivity.

Various short cuts have been devised to shorten the setup time to accurately position the work piece and one of these ways is to provide the jaws with so-called soft material which can relatively easily be machined. This soft material makes it possible to rotate the chuck on the lathe in a normal manner and machine the soft material to absolutely accurate concentricity to receive the work. However, even this has its limitations as the slight slack which exists between the operating parts of the chuck mechanism results in a more or less malpositioning of the jaws.

The present invention provides means for firmly holding the jaws in fixed positions relative to the chuck body so that its faces which are to receive and grip the work can be machined to the size which will accommodate the workpiece. Then when the workpiece is placed between the jaws and the jaws are tightened against the work, the workpiece is accurately positioned axially and it can be machined with absolute precision.

The time required to bring the jaws to this accurate position is minute compared to the time required to individually adjust the jaws. Moreover, the use of the jaw locking means of this invention requires significantly less time and produces greater accuracy of positioning the jaw faces than the other means which have been devised. For example, the means of this invention is an improvement on the arrangement disclosed in U.S. Pat. No. 3,679,221 which issued to A. J. Behrens on July 25, 1972, to a much greater degree.

That patent shows an eccentric wheel 84 which is mounted on a transverse shaft 82 so that when the wheel is turned and wedged against the face of the chuck body the effect will be to wedge the jaw itself against motion. The structure of the patent has some utility but as the eccentric wheel has merely a camming action to hold the jaw in place, it is not fully satisfactory. The structure provided by the present invention is simple and inexpensive and serves to rigidly hold the jaws in position on the chuck body.

The invention can be applied to the jaws of the aforesaid patent to take the place of the wedge wheel and in order to show a representative application of the invention this description and drawings illustrate this use. This makes it unnecessary to illustrate the internal mechanisms of the chuck since the patent can be referred to for this disclosure. For this reason the structure and wording of the patent are hereby incorporated herein by this reference.

The patent shows a two piece jaw made up of a lower, master portion and a top portion but the invention may be applied to a jaw unit which is in one piece, i.e., the master and top portions are integral. The jaw to which the invention may be applied may therefore be a simple unit which has soft material at its work bearing face or the jaw may have the complexity of the mentioned patent. The internal jaw moving mechanism is also immaterial in the practice of this invention.

BRIEF DESCRIPTION OF THE DRAWINGS

The invention is illustrated in the accompanying drawings in which.

DETAILED DESCRIPTION OF THE PREFERRED EMBODIMENTS

Figure 1:
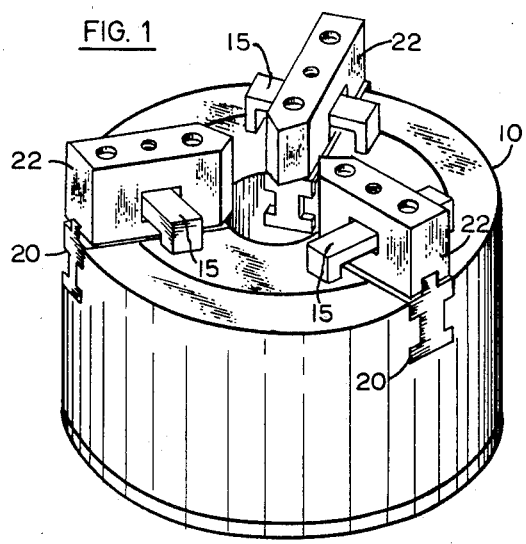
FIG. 1 is a perspective of a lathe chuck to which the structure of a preferred embodiment has been applied.

As stated above, the chuck 10 is basically the one of U.S. Pat. No. 3,679,221 and reference should be made to it for an understanding of the internal jaw operating mechanism. The master jaw 20 is the lower portion which fits in the chuck body in a dovetail-like relationship so that it can move only back and forth longitudinally in a radial direction. The top jaw 22 is the portion which is removably affixed to the master jaw 20 and it is made of soft steel material which is mechinable. It is to be understood that the invention can be applied as well to the composite jaws of the aforesaid patent which has inserts 64 or like inserts. The threaded stud bolts 32 and 34 hold the master jaw 20 and the top jaw 22 firmly together.

A feature of the invention is the formation of the transverse passageway or hole which goes entirely through the top jaw 22. This hole is preferably broached so that it is rectangular in cross section and has a flat top surface which is parallel to the face of the chuck body. It is important that this passageway be located somewhat midway of the length of the jaw 22 and that it does not conflict with the studs 32 and 34.

A further feature of the invention is the provision of the U-block 15 which fits in the passageway 12 and extends beyond the sides of the jaw 22. This block 15 is in an inverted position so that its end legs 16 and 17 will extend down and bear on the face of the chuck body. The opposite sides 18 of the central part of block 15 should be parallel and fit snugly between the parallel side walls of the passageway 12. The U-block can consequently move up and down within the passageway without tilting sidewise.

To force the U-block 15 downwardly the invention provides the pusher bolt 19 which is screwed in the threaded bore 21 of the top jaw 22. This bore 21 is vertical to the face of the chuck body and enters into the passageway 12 centrally thereof; this means that when the bolt is screwed in it will bear on the top of the U-block centrally of its top. The bolt 19 preferably has an Allen wrench socket in it and it lies below the top surface of jaw 22 so as to be out of the way.

Figure 3:
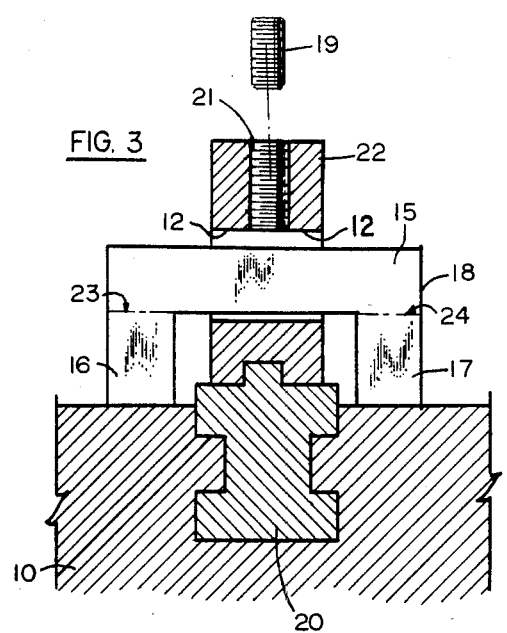
FIG. 3 is a section on the line 3—3 of FIG. 2.
Figure 2:
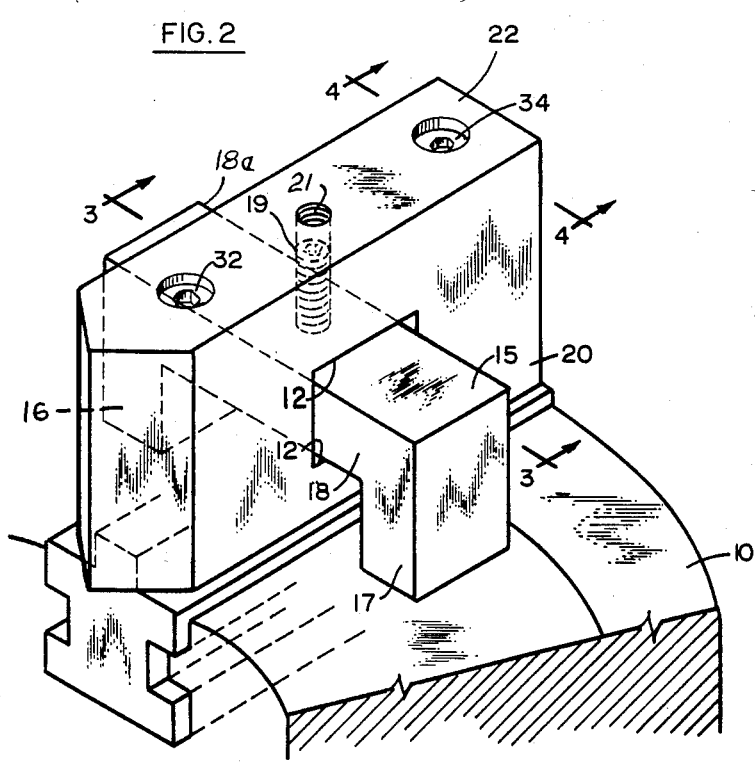
FIG. 2 is a perspective on a larger scale of one of the jaws.
Figure 4:
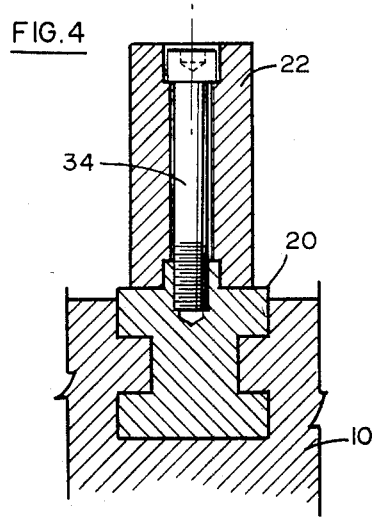
FIG. 4 is a section on the line 4—4 of FIG. 2.

The dimensions of the U-block fit the size of the jaw and the size and location of the passageway. The legs 16 and 17 should be long enough so there is clearance between the underside of the block and the bottom of the passageway. There must be a similar clearance between the top of the block and the ceiling of the passageway. This is shown in FIG. 3 which also shows that the bolt 19 bears on the top of the block at a mid point. As stated above, the block fits snugly between the sidewalls of the passageway.

This structure serves to directly push up the jaw 22 to rigidly hold it in place. There is no tendency to tilt the jaw at an angle as is true of the eccentric wheel which is shown in the U.S. Pat. No. 3,679,221 which puts pressure on one side only of the jaw. Instead of the wedging action of the patent, which can slip, the even-sided pressure exerted by the invention structure eliminates all chance of slippage.

Variations in the structure can be made. For instance the legs 16 and 17 can be separate pieces from the crosswise part of the block. This is indicated by the construction lines at 23 and 24 in FIG. 3 and this has the advantage that the machinist can have leg blocks of pairs of different heights to fit the particular situation. The U-block and the clamping bolt 19 can be sold with the jaw or as separate purchasable parts.

To use the structure of the invention, the jaws are brought to approximately the correct position for the machining operation, and the bolt 19 is screwed down firmly against it. This holds the jaw firmly in place for the cutting operation, after which the bolt 19 is released, and the work piece is positioned in place. It is not essential that the block 15 be removed as it may be allowed to remain loosely in place as it will not interfere with the normal operation of the jaws.

The figures show the size of the block, more or less, relative to the jaw and it will be appreciated that this may vary. If larger or smaller jaws are to have the invention applied to them the block 15 and the passageway 12 would be proportionately larger or smaller. The bolt 19 which serves as functional means to urge the jaw upwardly and the block 15 downwardly is to be proportionately sized.

Figure 7:
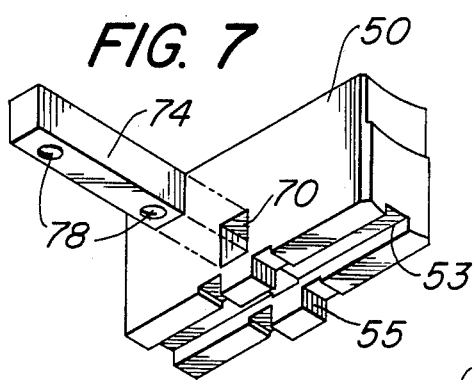
FIG. 7 is a perspective view showing the underside of the soft jaw shown in FIGS. 5 and 6.
Figure 8:
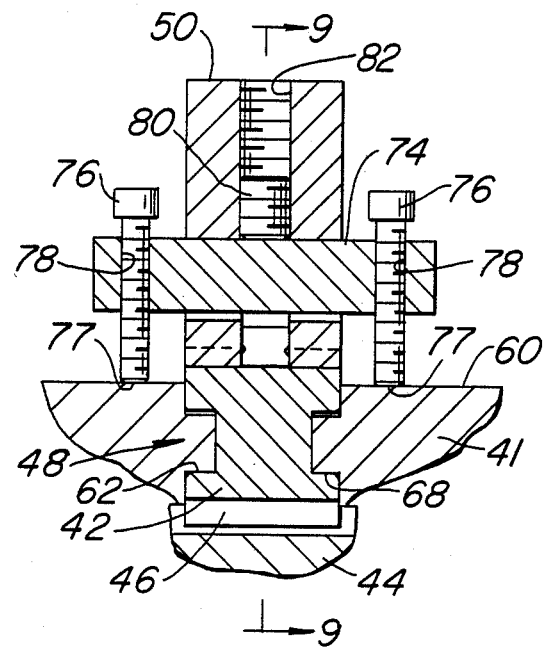
FIG. 8 is a sectional view taken on line 8—8 of FIG. 6.

FIGS. 5–9 show another embodiment of the invention in which the lathe chuck 40 and its associated master jaws 42 (also known in the art as "hard jaws") are constructed in the manner of the most common types of lathe chucks in use today. In this conventional construction, the operating mechanism for the lathe chuck 40 comprises a wrench engageable actuating means 43 which causes movement of a worm gear 44 which is threadedly engaged with worm teeth 46 on the bottom of the master jaws 42. Each of the master jaws 42 is guided for sliding movement relative to the chuck body 41 in ways 48 therein extending radially to the chuck axis. In the conventional use of the chuck 40, the actuating means 43 is operated to turn the worm gear 44 to cause the master jaws 42 to slide along the ways 48 radially of the chuck axis to set the master jaws 42 to a workpiece holding position. As shown in FIG. 8, the ways 48 have a pair of opposed key-like projections received in corresponding grooves in the master jaw 42.

Each of the master jaws 42 has an associated easily machinable soft jaw 50 mounted thereon and secured thereto for conjoint movement therewith as a unit. To this end, as is conventional, each master jaw 42 is provided on its top with a longitudinally extending key 52 which fits into a longitudinally extending keyway 53 in the bottom of the associated soft jaw 50, the function of this keyed arrangement being that the master jaw 42 and the soft jaw 50 are secured in a fixed position relative to one another along a first axis. The master jaw 42 is also provided on its top with a transversely extending keyway 54 adapted to receive a transversely extending key 55 on the bottom of soft jaw 50 (see FIG. 6) so that the master jaw 42 and the soft jaw 50 are secured in a fixed position relative to one another along an axis that is perpendicular to said first axis thereof.

Figure 9:
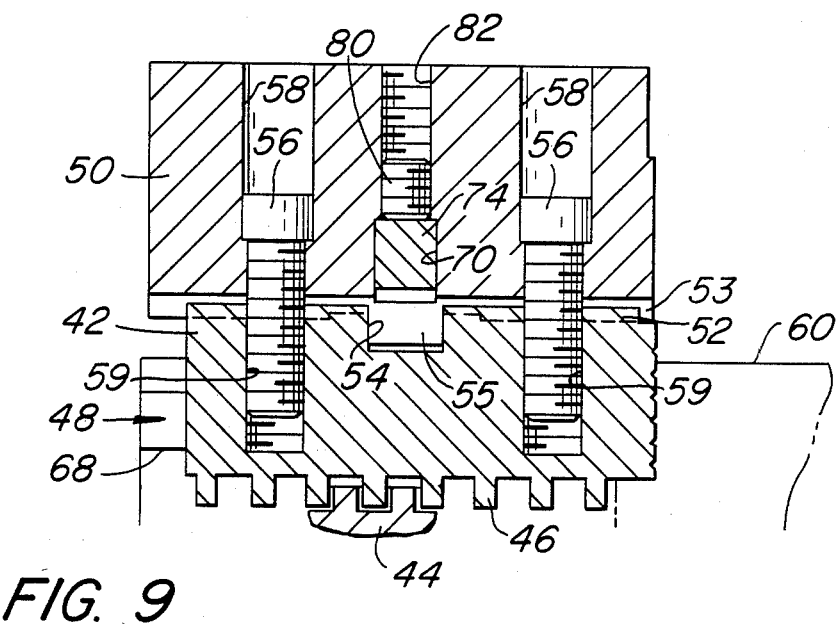
FIG. 9 is a sectional view taken on line 9—9 of FIG. 8.

A pair of threaded stud bolts 56 are mounted in bores 58 in the soft jaw 50 and extend therethrough to threadedly engage the master jaw 42 in aligned threaded bores 59 to secure the master jaw 42 and soft jaw 50 firmly together as a unit, this engagement being shown in FIG. 9. The above-described arrangement whereby the master jaw 42 and the soft jaw 50 are secured together in a fixed relationship by the use of the bolts 56 and cooperating keys 52, 55 and keyways 53, 54 is a typical constructon well known in the art. By this construction, the master jaw 42 and the soft jaw 50 are mounted for movement across the face 60 on the lathe chuck 40 as the master jaw 42 slides in the ways 48 and is caused to move therealong by operation of the jaw setting means of the lathe chuck 40.

FIG. 8 illustrates that in an actual lathe chuck there is a certain amount of slack between the cooperating grooves in the master jaw 42 and the key projections in the ways 48 guiding the movement thereof. In FIG. 8 this slack is shown in an exaggerated dimension and it is to be understood that this slack is typically a very small amount. However, as stated above, this slack prevents machining the soft jaws 50 to absolute accurate concentricity and it is important that its deleterious effect be obviated. As is apparent from FIG. 8, the master jaw 42 and the ways 48 in the lathe chuck 40 are provided with opposed surface portions 62 and 68, respectively, limiting movement of the master jaw 42 toward the chuck face 60.

In accordance with the invention, the soft jaw 50 is provided with a passage 70 extending transversely therethrough. This passage is preferably formed by broaching so that it is rectangular in cross-section and has a flat top surface or ceiling 72 which is parallel to the face 60 of the chuck body 41 (see FIG. 8). As best shown in FIG. 9, the passageway 70 is located approximately midway of the length of the soft jaw 50 and overlies the key portion 55 thereof.

In accordance with the invention, there is provided means for frictionally locking the master jaw and the soft jaw unit in a fixed position relative to the chuck body 41. To the end, there is provided a block 74 mounted in the transverse passage 70. The block 74 has a sliding fit in contact with the sidewalls of the passageway 70, the fit being one permitting movement of the block 74 in the passageway 70. The block 74 is of a length such that it has portions extending laterally from the sidewalls of the soft jaw 50 in generally parallel relation to the chuck face 60 as is best shown in FIG. 8.

There are provided a pair of leg members 76 extending from the extended portions of the block 74 towards the chuck face 60 for frictionally engaging the same at their lower ends. In the embodiment of the invention shown in FIGS. 5-9, the leg members 60 comprise screw means threadedly mounted in threaded bores 78 in the extended portions of the block 74 so that rotation thereof in the threaded mounting therefor causes movement of the leg members 76 toward or away from the chuck face 60 as desired.

In accordance with the invention, there are provided actuating means causing the ends 77 of the leg members 76 to come into frictional engagement with the chuck face 60 and to cause the soft jaw 50 to move away from said chuck face 60 to cause the opposed surface portions 62 and 68 of the master jaw 42 and the ways 48 to be frictionally engaged so that the master jaw and soft jaw unit is frictionally locked in a fixed position relative to the chuck body 41. This actuating means includes means on each of the leg members 76 for causing rotation thereof, i.e., the head of the each screw means, these heads being formed to be engaged by an Allenhead wrench. Also, it will be apparent that the head of the screw-type leg members could be manually turned if desired.

The actuating means also comprises a screw member 80 threadedly mounted in a threaded bore 82 in the soft jaw 50 in an arrangement so as to engage the top wall of the block 74 at a location in the center of the transverse passage 70 by extending through the ceiling 72. The screw member 80 is movable, by rotation thereof, into contact with the block 74 to cause the same to move in the transverse passage 70 toward the chuck face 60 so that the ends 77 of the leg members 76 are caused to frictionally engage the chuck face 60 and, also to cause movement of the soft jaw 50 away from the chuck face 60 to thereby cause the oppposed surface portion 62 and 68 of the master jaw 42 and the ways 48 to become frictionally engaged so that the master jaw and soft jaw unit is frictionally locked in a fixed position relative to the chuck body 41.

Figure 5:
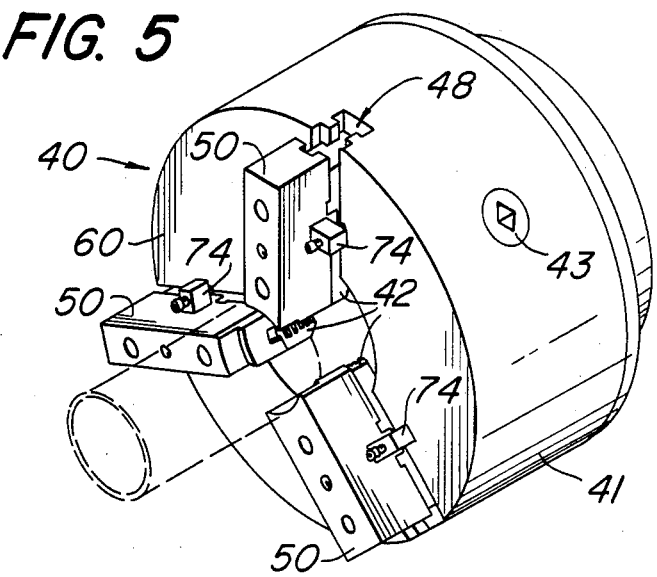
FIG. 5 is a perspective view of a lathe chuck to which another embodiment of the invention has been applied.
Figure 6:
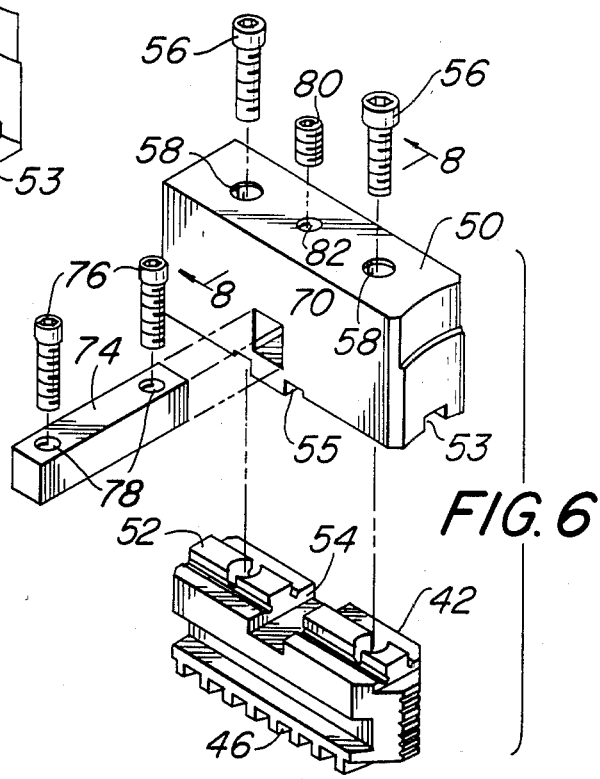
FIG. 6 is an exploded perspective view showing the master jaw and soft jaw of the embodiment shown in FIG. 5.

In the use of the embodiment shown in FIGS. 5-9, the screw-type leg members 76 are initially adjusted to a position wherein the ends 77 thereof are close to being in contact with the chuck face 60. The soft jaw 50 is the secured into the desired position by turning the screw member 80 to move in bore 82 toward the chuck face 60 and into passageway 70 through the ceiling 72. As the screw member 80 moves into passageway 70 it contacts the top wall of block 74 and moves the block 74 downwardly toward the chuck face 60 until the ends 77 of screw members 76 come into contact with the chuck face. Continued rotation of screw member 80 in the same direction then causes the soft jaw 50, and the master jaw 42 secured thereto, to be moved away from the chuck face 60, which movement causes the opposed surface portions 62 and 68 of the master jaw 42 and the ways 48 to become frictionally engaged. The rotation of the screw member 80 is continued until the master jaw and the soft jaw unit is frictionally locked in a fixed position relative to the chuck body 41. The same procedure is carried out for each of the soft jaw and master jaw units whereby the three units are all secured in a fixed or "positive" position in preparation for the machining of the soft jaws 50. Accordingly, when the three soft jaws 50 are machined, the resulting machining operation will provide on the soft jaws 50 workpiece engaging surfaces which are accurately concentric relative to one another. FIG. 5 shows the soft jaws 50 after a typical machining operation thereof has been completed and on position to receive a workpiece. As shown in FIGS. 5-7, the soft jaws 50 have been machined at two diameters to form a stop for the end of the workpiece to be held thereby.

The above-described mode of use of the embodiment shown in FIGS. 5-9 has the advantage that each time it is desired to release the soft jaw only one part, i.e., screw member 80, has to be turned. However, it should be noted that the setting of the soft jaw and master jaw unit could also be achieved without the use of the center screw member 80 and the locking operation could be achieved by operating the leg members 76 alone. In this case, the two leg members 56 are rotated in a direction to cause the ends 77 thereof to move toward the chuck face 60. After these ends 77 come into contact with the chuck face 50, continued rotation thereof in the same direction will cause the block 74 to slide in the passageway 70 toward the ceiling 72 thereof. After the top wall of the block 74 comes into contact with the ceiling 72 of passageway 70, continued rotation of the leg members 76 in the same direction described above causes the soft jaw 50, and the master jaw 42 secured thereto, to mve away from the chuck face 60 whereby the master jaw 42 will move so as to bring the opposed surface portion 62 and 68 of the master jaw 42 and the ways 48 into frictional contact as shown in FIG. 8. The rotation of leg members 76 is continued until the master jaw and soft jaw unit is frictionally locked in a fixed position relative to the chuck body 41.

What is claimed is:

1. In a lathe chuck having a master jaw guided for sliding movement relative to the chuck body in ways in the chuck body extending radially to the chuck axis by the jaw setting means of the lathe to a workpiece holding position, and a soft jaw mounted on and secured to the master jaw for conjoint movement therewith as a unit, the master jaw and the soft jaw being mounted for movement across the face of the lathe chuck as the master jaw slides in the ways, the ways and the master jaw having opposed surface portions limiting movement of the master jaw toward the chuck face, the improvement comprising:

a passage in the soft jaw extending transversely therethrough, and means for frictionally locking said master jaw and soft jaw unit in a fixed position relative to the chuck body including a block mounted in said transverse passage, said block having portions extending laterally from sidewalls of the soft jaw in generally parallel relation to the chuck face, leg members extending from said extended portions of said block towards the chuck face for frictionally engaging the same at the ends of said leg members, and actuating means for causing the ends of said legs to come into frictional engagement with the chuck face and said soft jaw to move away from said chuck face to cause said opposed surface portions of said master jaw and the ways to be frictionally engaged so that said master jaw and soft jaw unit is frictionally locked in a fixed position relative to the chuck body.

2. The improvement in a lathe chuck as recited in claim 1 wherein said leg members are threadedly mounted in said extended portions of said block so that rotation thereof in said threaded mounting causes movement of the leg members toward or away from the chuck face.

3. The improvement in a lathe chuck is recited in claim 2 wherein said actuating means comprises means on each of said leg members for causing rotation thereof and movement of the ends of said leg members into frictional engagement with the chuck face.

4. The improvement in a lathe chuck as recited in claim 3 wherein said actuating means comprises a screw member threadedly mounted in said block and adapted to engage the block in said transverse passage, said screw member being moveable into engagement with said block to cause the same to move in said transverse passage toward said chuck face so that the ends of said leg members frictionally engage the same and to cause said soft jaw to move away from said chuck face.

5. The improvement in a lathe chuck according to claim 1 wherein said block and said leg members are a unitary structure so that said leg members extend downwardly from a base portion toward the chuck face to provide a U-shaped configuration.

6. The improvement in a lathe chuck according to claim 5 wherein said actuating means comprises a screw member threadedly mounted in said block and adapted to engage the block in said transverse passage, said screw member being movable into engagement with said block to cause the same to move in said transverse passage toward said chuck face so that the ends of said leg members frictionally engage the chuck face and to cause said soft jaw to move away from said chuck face.

7. The improvement in a lathe chuck as recited in claim 1 wherein said actuating means comprises a screw member threadedly mounted in said block and adapted to engage the block in said transverse passage, said screw member being movable into engagement with said block to cause the same to move in said transverse passage toward said chuck face so that the ends of said leg members frictionally engage the same and to cause said soft jaw to move away from said chuck face.

8. In a lathe chuck having a master jaw guided for sliding movement relative to the chuck body in ways in the chuck body extending radially to the chuck axis by the jaw setting means of the lathe to a workpiece holding position and a soft jaw mounted on and secured to the master jaw for conjoint movement therewith as a unit, the master jaw and the soft jaw being mounted for movement across the face of the lathe chuck as the master jaw slides in the ways, the ways and the master jaw having opposed surface portions limiting movement of the master jaw toward the chuck face, the improvement comprising:

a passage in the soft jaw extending transversely therethrough and defining a ceiling wall extending in generally spaced apart parallel relation to the chuck face, and means for frictionally locking said master jaw and soft jaw unit in a fixed position relative to the chuck body including a block mounted in said transverse passage for slidable movement toward and away from said ceiling wall thereof, said block having portions extending laterally from sidewalls of the soft jaw in generally parallel relation to the chuck face, leg members extending from said extended portions of said block toward the chuck face for frictionally engaging the same at the ends of said leg members, and actuating means for causing movement of the ends of said legs into frictional engagement with the chuck face and movement of said soft jaw away from said chuck face to cause said opposed surface portions of the master jaw and the ways to be frictionally engaged so that said master jaw and soft jaw unit is frictionally locked in a fixed position relative to the chuck body.

9. The improvement in a lathe chuck as recited in claim 8 wherein said leg members are threadedly mounted in said extended portions of said block so that rotation thereof in said threaded mounting causes movement of the leg members toward or away from the chuck face.

10. The improvement in a lathe chuck as recited in claim 9 wherein said actuating means comprises means on each of said leg members for causing rotation thereof and movement of the ends of said leg members into frictional engagement with the chuck face.

11. The improvement in a lathe chuck as recited in claim 10 wherein said actuating means comprises a screw member threadedly mounted in said block and adapted to engage the block in said transverse passage, said screw member being movable into engagement with said block to cause the same to move in said transverse passage toward said chuck face so that the ends of said leg members frictionally engage the same and to cause said soft jaw to move away from said chuck face.

12. The improvement in a lathe chuck according to claim 8 wherein said block and said leg members are a unitary structure so that said leg members extend downwardly from a base portion toward the chuck face to provide a U-shaped configuration.

13. The improvement in a lathe chuck according to claim 12 wherein said actuating means comprises a screw member threadedly mounted in said block and adapted to engage the block in said transverse passage, said screw member being moveable into engagement with said block to cause the same to move in said transverse passage toward said chuck face so that the ends of said leg members frictionally engage the chuck face and to cause said soft jaw to move away from said chuck face.

* * * * *